(12) United States Patent
Yang et al.

(10) Patent No.: US 8,052,413 B2
(45) Date of Patent: Nov. 8, 2011

(54) IMPRINT DEVICE

(75) Inventors: Sen-Yeu Yang, Taipei (TW); Tzu-Chien Huang, Taipei (TW); Jyun-Kai Ciou, Taipei (TW); Bin-Da Chan, Taipei (TW)

(73) Assignee: National Taiwan University, Taipei (TW)

( * ) Notice: Subject to any disclaimer, the term of this patent is extended or adjusted under 35 U.S.C. 154(b) by 256 days.

(21) Appl. No.: 12/318,978

(22) Filed: Jan. 14, 2009

(65) Prior Publication Data

US 2009/0186114 A1    Jul. 23, 2009

(30) Foreign Application Priority Data

Jan. 18, 2008   (TW) .............................. 97101958 A

(51) Int. Cl.
*B29C 59/00* (2006.01)
(52) U.S. Cl. .................. 425/385; 425/405.1; 425/387.1; 425/389
(58) Field of Classification Search ............... 425/174.4, 425/385, 405.1, 387.1, 389; 264/293
See application file for complete search history.

(56) References Cited

U.S. PATENT DOCUMENTS

| | | | | |
|---|---|---|---|---|
| 6,482,742 B1 * | 11/2002 | Chou | ............................ | 438/690 |
| 7,090,716 B2 * | 8/2006 | McMackin et al. | ............. | 95/246 |
| 7,658,604 B1 * | 2/2010 | Yang et al. | .................... | 425/385 |
| 2005/0172848 A1 * | 8/2005 | Olsson | ........................ | 101/493 |

* cited by examiner

*Primary Examiner* — Maria Veronica Ewald
(74) *Attorney, Agent, or Firm* — Rosenberg, Klein & Lee

(57) ABSTRACT

An improved imprint device is disclosed. It comprises a drive component, an imprinting object, and at least one mold, stacked together within a chamber, a fluid supplier is used for providing the solvent fluid into the chamber through a pipe. The solvent fluid will permeate the imprinting object, and the imprinting object will be plasticized at the temperature lower than the glass transition temperature. The drive component is used for driving the mold to the plasticized imprinting object, so that the pattern on the mold will be imprinted on the imprinting object. It is the advantage of the present invention to reduce the process temperature, prevent the pattern distortion, and save the process time. Furthermore, by using the fluid and a barrier film as a pressing medium, the pressure can be applied to the object and the mold uniformly, such that a large area imprint can be achieved.

15 Claims, 5 Drawing Sheets

IMPRINT DEVICE

FIELD OF THE INVENTION

The present invention relates to an improved imprint device, and more particularly to an improved imprint device that is applied with the solvent fluid under the temperature lower than the glass transition temperature.

BACKGROUND OF THE INVENTION

The development of the Micro Electro Mechanical System (MEMS) was beginning on the year 1990, which integrates multiple areas technologies, including the mechanism, electronics, optoelectronics, material, control, and chemical. Accordingly, the MEMS can be applied to miniaturize the product, and further improve the performance, reliability, quality and value added of the product, as well as, reduce the manufacturing cost and power consumption, for being convenient with the manufacturing and human life.

The micro hot embossing process is one of the areas of the MEMS technology, used for replicating the micro structure. The size unit of the micro structure is around nm to μm, and is able to be used as component directly or applied on other process.

Regarding to the micro hot embossing process, a mold is placed with a top pressing plate, and a plastic material used for hot embossing is placed with a bottom pressing plate, wherein these two pressing plates are regarded as heating/cooling devices for heating and cooling the plastic material. Therefore, while the plastic material will be hot embossed, the top pressing plate and the bottom pressing plate will be heated to the temperature higher than the glass transition temperature (Tg) of the plastic material. In the meantime, a driver will drive the top pressing plate and/or the bottom pressing plate to press on the mold and the plastic material. Accordingly, since the temperature of the plastic material is higher than the Tg thereof, the plastic material will become mobile, and further be full of the cavity of the mold and plasticized. Thereafter, the top pressing plate and the bottom pressing plate will be cooled to the temperature that is lower than the Tg of the plastic material after a determined imprint period. As long as the plastic material has getting solidified, and then the mold will be removed for having the product.

SUMMARY OF THE INVENTION

Therefore, an object of the present invention is to provide an improved imprint device, which is applied to plasticize and further imprint the imprinting object under the temperature that is lower than the Tg of the imprinting object, such that the warp, distortion, and optical-character altered of the object occurred according to the residual thermal stress therein are prevented, accordingly, the imprint accuracy can be improved, furthermore, the shortcomings of the hot embossing device, such as being expensive, function limited, mechanic structure complicated, and maintenance difficult, can be settled.

Another object of the present invention is to provide an improved imprint device, wherein a high-pressure solvent fluid is further permeated into the imprinting object for speeding the plasticizing process.

Another object of the present invention is to provide an improved imprint device, wherein the fluid can be used for pressing the barrier film to the mold uniformly for imprint, such that the purposes of the lager area imprint, rapidly replicating, and manufacture simplifying can be achieved, as well as, the imprinting object material is unlimited, the imprinting object broken can be prevented, accordingly, the advantages, such as the environmental protection, cleanness, and power save, can be obtained.

The present invention provides an improved imprint device, comprising a chamber comprising a first pipe disposed at one side of the chamber, wherein a first fluid supplier is connected to the chamber through the pipe; an imprinting object provided within the chamber, wherein the imprinting object can be permeated by a solvent fluid from the first fluid supplier and further be plasticized; a first mold provided within the chamber, and stacked on the top of the imprinting object; and a drive component provided above the first mold within the chamber, used for pressing the first mold.

DETAILED DESCRIPTION OF DISCLOSED EMBODIMENTS

Figure 1A:
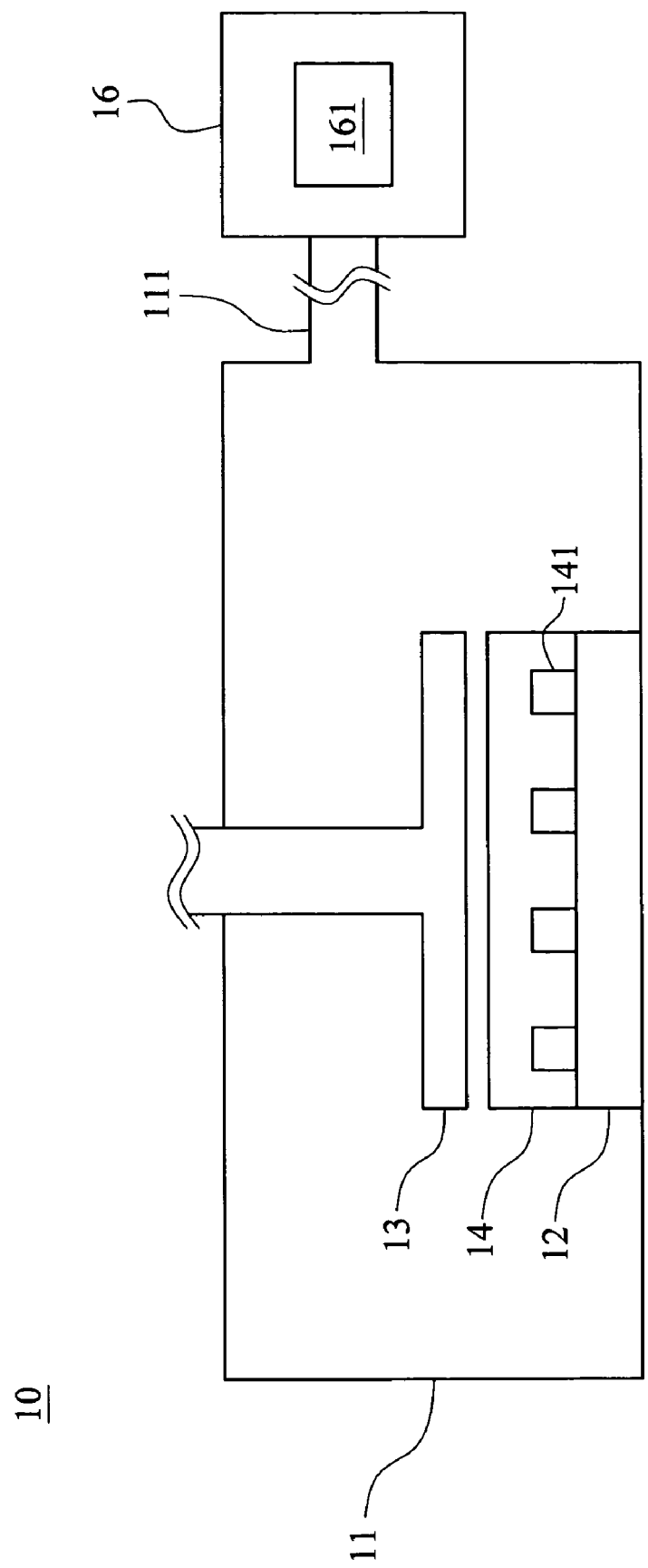
FIG. 1A shows a structure cross-sectional diagram of an improved imprint device according to a preferred embodiment of the present invention.

Referring to FIG. 1, the improved imprint device 10 comprises a chamber 11, an imprinting object 12, such as a macromolecule material, a first mold 14 and a drive component 13, such as a pressing plate. The first mold 14 is stacked on the imprinting object 12, both of which are provided within the chamber 11. A first pipe 111 is disposed at one side of the chamber 11. A first fluid supplier 16 is used for supplying a solvent fluid 161 into the chamber 11 through the first pipe 111. The imprinting object 12 will be permeated by the solvent fluid and further be plasticized, such that the imprinting object 12 will become mobile. The drive component 13 is provided above the first mold within the chamber 11, used for pressing the first mold 14. Then the plasticized imprinting object 12 will be driven to flow and further full up cavities 141 of the first mold 14. Thereafter, the solvent fluid 161 will be withdrew from the chamber 11, after the imprinting object 12 has solidified, the pattern provided on the first mold 14 will be imprinted on the imprinting object 12.

The improved imprint device 10 is operated under an operation temperature lower than the glass transition temperature (Tg). The imprint process will proceed under the room temperature. Comparing with the prior art, the imprinting object 12 will not be warped, distorted, and optical-character altered since there is no residual thermal stress caused the heating and cooling processes. Therefore, the imprint accuracy will be improved, as well as, the shortcomings of the hot embossing device, such as being expensive, function limited, mechanic structure complicated, and maintenance difficult, can be settled. The solvent fluid 161, such as the organic fluid, including acetone, toluene, ether, methanol, ethanol, isopropanol, and so on, or the gaseous material, including $CO_2$, $N_2H$, $SF_6$, Xe, $CHF_3$, $CCL_2F_2$, $NH_3$, and so on, can be used for permeating into the imprinting object 12, such as a macromolecule material, to further plasticize the imprinting object 12.

Figure 1B:
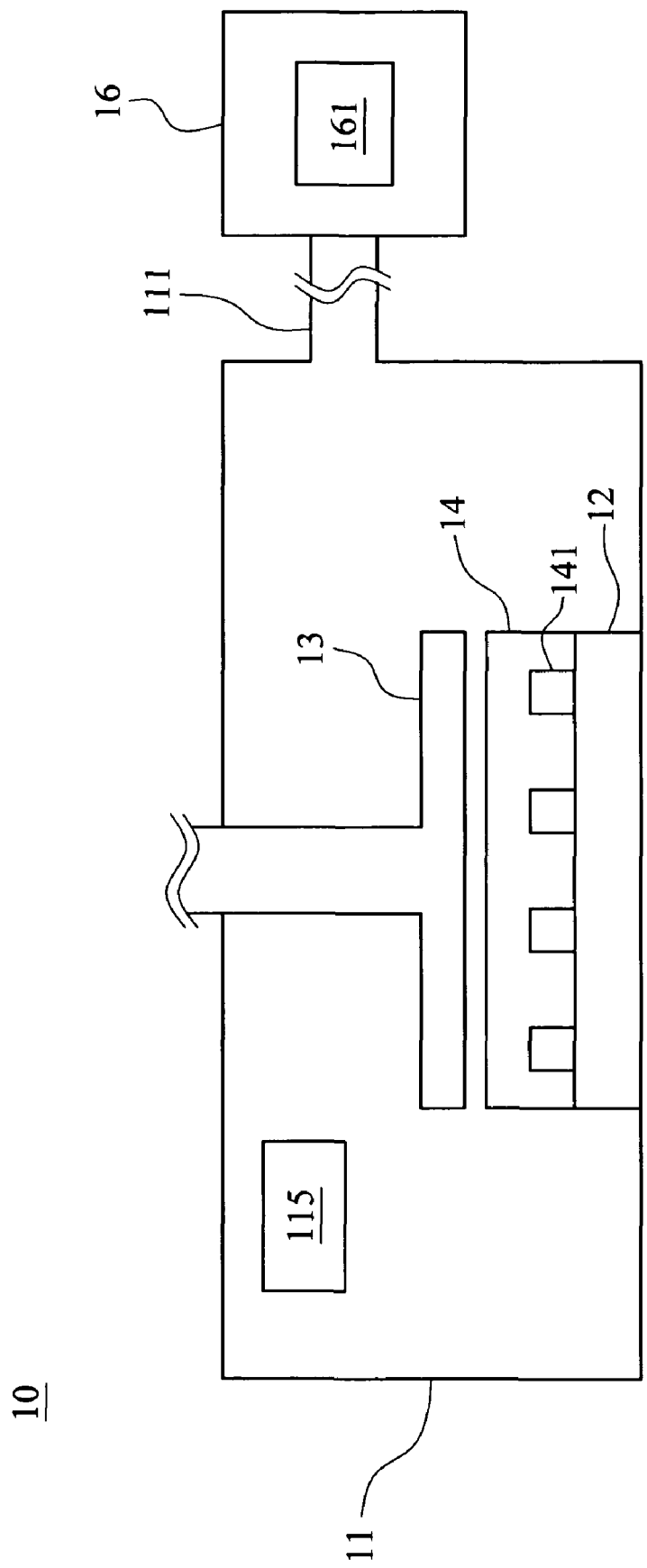
FIG. 1B shows a structure cross-sectional diagram of an improved imprint device according to another preferred embodiment of the present invention.

Referring to FIG. 1B, the improved imprint device 10 further comprises a heating source 115, which is used for heating the first mold 14 and/or the imprinting object 12, for speeding the plasticizing process. However, the heating temperature is still lower than the Tg of the imprinting object 12, thus, the imprinting object 12 will not be warped, distorted, and optical-character altered according to the residual thermal stress.

Regarding an embodiment, for speeding the plasticizing process, the solvent fluid 161 is a high-pressure fluid. According to the solvent fluid 161, such as the acetone, toluene, ether, methanol, ethanol, isopronanol, $CO_2$, $N_2H$, $SF_6$, Xe, $CHF_3$, $CCL_2F_2$, or $NH_3$, is compressed and supplied into the chamber 11 for plasticizing the object 12. For example, the pressure of the solvent fluid 161 can be around 10 $kg/cm^2$ to 200 $kg/cm^2$, and the permeating time for the solvent fluid can be around 1 minute to 120 minutes.

Figure 2:
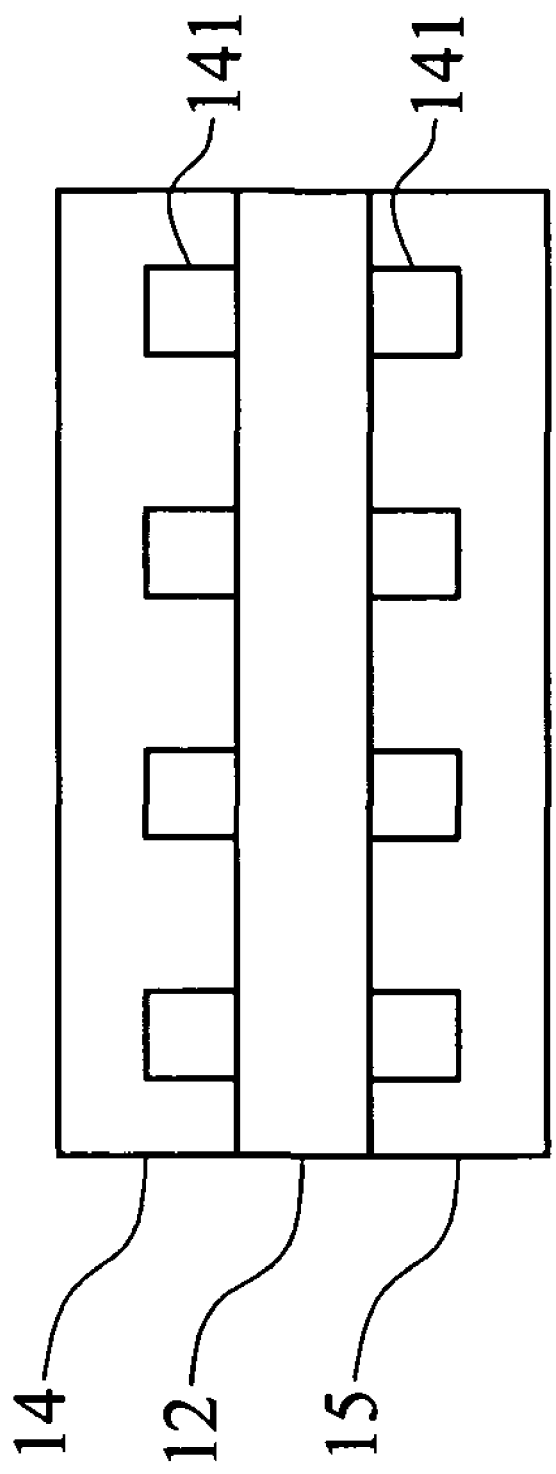
FIG. 2 shows a structure cross-sectional diagram of a mold according to a preferred embodiment of the present invention.

Referring to FIG. 2, the bottom of the imprinting object 12 are further stacked on a second mold 15. While the imprinting object 12 is plasticized by the solvent fluid 161, the drive component 13 will press on the first mold 14 to result that the patterns of the first mold 14 and the second mold 15 will be imprinted on the two sides of the imprinting object 12.

The first mold 14 and the second mold 15 are respectively selected from one of the micro-machine micro-fabricated mold, the silicon wafer fabricated mold, the electroformed nickel mold, the glass substrate mold, and/or other micro-fabricated micro-mold.

Figure 3:
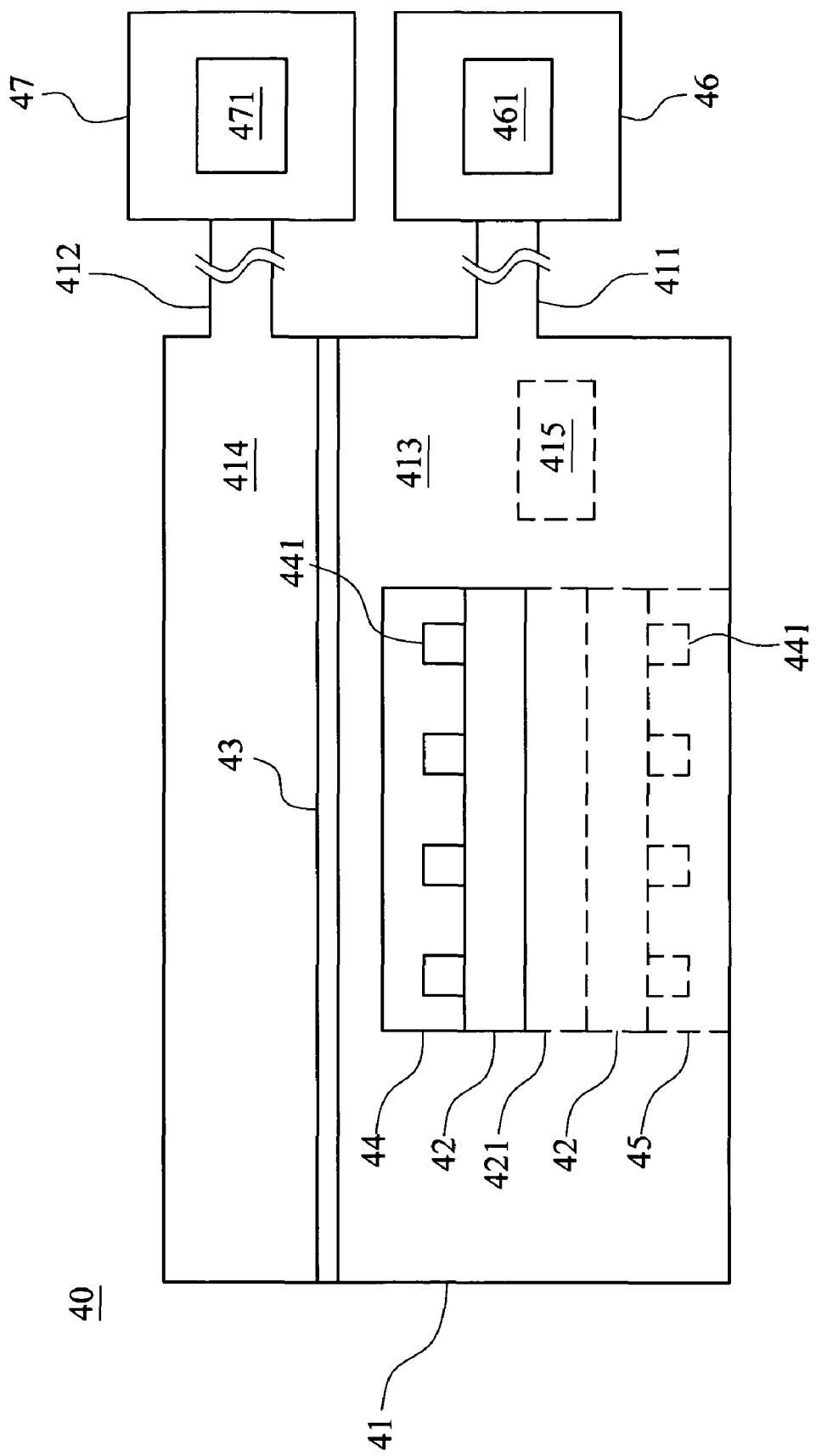
FIG. 3 shows a structure cross-sectional diagram of an improved imprint device according to another preferred embodiment of the present invention.

Regarding to an embodiment, the improved imprint device can be used for larger area imprint and rapidly imprint, as well as, the imprinting object material is unlimited, such that the shortcomings of the prior art can be prevented. Referring to FIG. 3, the drive component 43 is a flexible barrier film, which divides the chamber 41 into two parts, including a first sub-chamber 413 and a second sub-chamber 414. The first pipe 411 and the second pipe 412 are disposed at the first sub-chamber 413 and the second sub-chamber 414 respectively. The imprinting object 42 and the first mold 44 are provided within the first sub-chamber 413, and the second sub-chamber 414 is connected to a second fluid supplier 47 through the second pipe 412. The solvent fluid 461 and a pressing fluid 471 are supplied into the first sub-chamber 413 and the second sub-chamber 414 from the first fluid supplier 46 and the second fluid supplier 47, and the pressures of these two sub-chambers 413 and 414 have to be balanced for preventing the drive component 43 from being broken. The solvent fluid 461 can be used for plasticizing the imprinting object 42, such that the imprinting object 42 will become mobile. Thereafter, the relative pressure of the first sub-chamber 413 and the second sub-chamber 414 will be altered to result that the pressing fluid 471 drives the drive component 43 to press the first mold 44. Therefore, the imprinting object 42 will flow and full up the cavity 441 of the first mold 44. And then, the solvent fluid 461 and the pressing fluid 471 will be withdrew from the first sub-chamber 413 and the second sub-chamber 414, the first mold 44 will not be pressed, and the imprinting object 42 will become solidified since the mobility disappears. Thus, the pattern of the first mold 44 will be imprinted to the imprinting object 42.

The drive component 43, such as the barrier film, is driven by the pressing fluid 471 that the pressure will be applied uniformly to the imprinting object 42 and the first mold 44. Such that a larger area imprinting, such as the sizes of 4 inches, 6 inches, 8 inches, 12 inches, or more than 12 inches can be achieved, as well as, the manufacture simplifying, and the rapidly replicating. Comparing with the drive component 13 with pressing plate structure, the pressures applied on the imprinting object 12 and the first mold 14 are possibly various. The drive component 43 with the barrier film structure will improve the reliability and yield. Furthermore, the pressing fluid 471 can be various kinds of materials, such as the air or a non-corrosive liquid (such as the water). Since the pressing fluid 471 is easier for obtaining, the manufacturing cost can be reduced surely.

Regarding to the embodiment, the operation temperature of the improved imprint device 40 is lower than the Tg of the imprinting object 42, and the bottom of the imprinting object 42 can further comprise a second mold 45, disclosed as previous description.

For speeding the plasticizing process, the solvent fluid 461 can be a high-pressure fluid. The solvent fluid 461, such as the acetone, toluene, ether, methanol, ethanol, isopronanol, $CO_2$, $N_2H$, $SF_6$, Xe, $CHF_3$, $CCL_2F_2$, or $NH_3$, is compressed and supplied into the chamber 11 for plasticizing the imprinting object 12. For example, the pressure of the solvent fluid 161 can be around 10 $kg/cm^2$ to 200 $kg/cm^2$, and the permeating time for the solvent fluid can be around 1 minute to 120 minutes. As well as, the pressing fluid 471 will be a high-pressure fluid for balancing the pressures of the first sub-chamber 413 and the second sub-chamber 414 to prevent the drive component 43 from being broken.

Furthermore, the improved imprint device 40 further comprises a heating source 415, which is used for heating the first mold 44 and/or the imprinting object 42, for speeding the plasticizing process, wherein the heating temperature is lower than the Tg of the imprinting object 42 still.

Since the drive component 43 can apply the pressure uniformly on the imprinting object 42 and the first mold 44, the imprinting object 42 will not be broken due to the various pressure. For example, the imprinting object 42 further comprises a base 421, which is a brittle material, such as a wafer, a glass material, or a plastic material. Therefore, according to the previous disclosed imprinting process, the imprinting object 42 will be imprinted with the pattern of the first mold 44, and the base 421 of the imprinting object 42 will not be broken. Thus, it is not necessary for a imprinting object 42 with a brittle base 421, such as a silicon wafer, to prepare an electroformed nickel mold. Such that the manufacturing process will be simplified and the manufacturing cost will be reduced, accordingly, the advantages, such as the environmental protection, cleanness, and power save, can be obtained.

As well as, the first mold 44 and the second mold 45 are respectively selected from one of the micro-machine micro-fabricated mold, the silicon wafer fabricated mold, the electroformed nickel mold, the glass substrate mold, and/or other micro-fabricated micro-molds.

Figure 4:
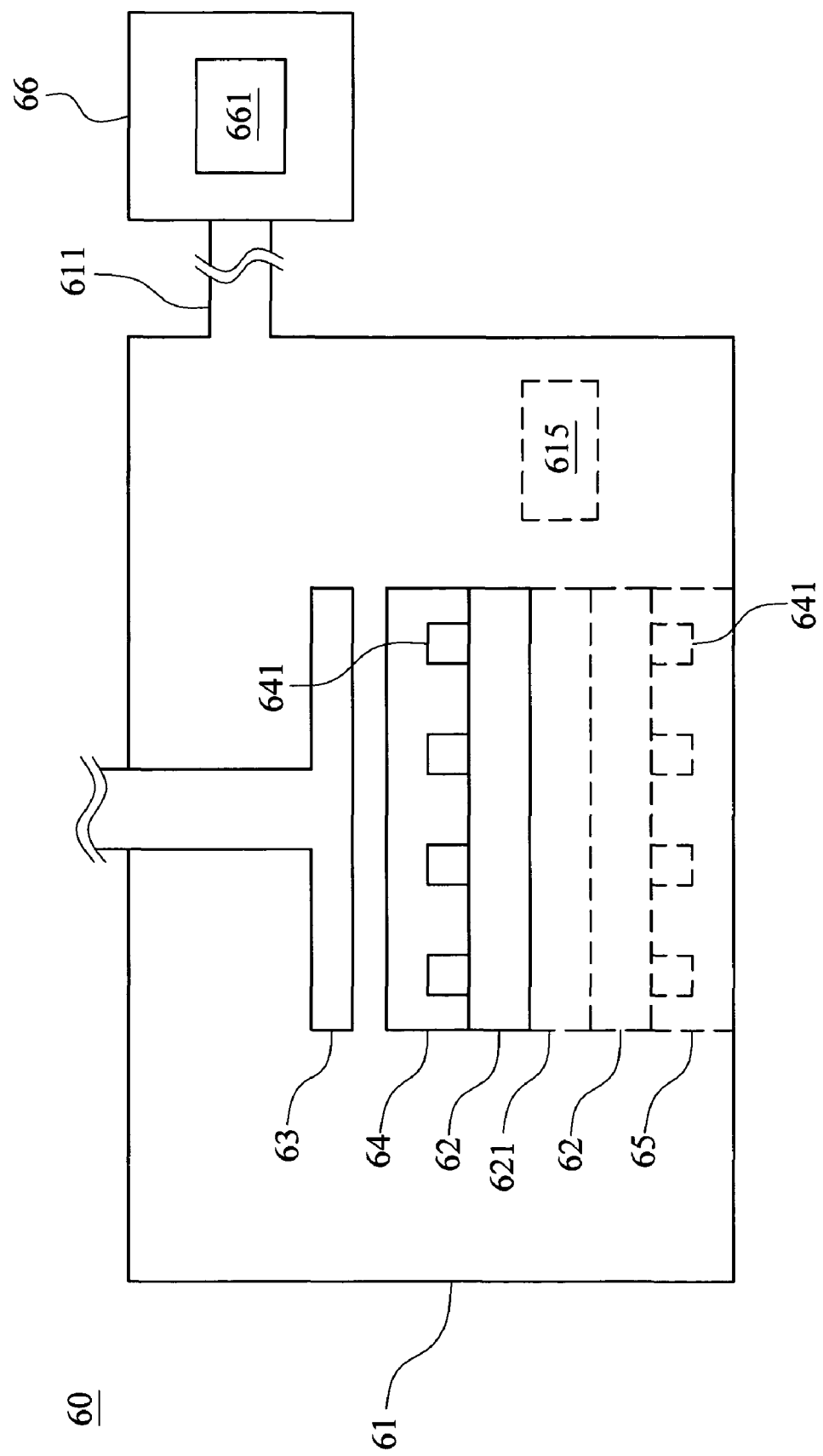
FIG. 4 shows a structure cross-sectional diagram of an improved imprint device according to another preferred embodiment of the present invention.

Referring to FIG. 4, once the drive component can apply the pressure uniformly on the imprinting object 62 and the first mold 64, the imprinting object 62 can further comprise a base 621 as well, wherein the base 621 is a brittle material, such as a wafer, a glass material, or a plastic material. Therefore, according to the previous disclosed imprinting process, the imprinting object 62 will be imprinted with the pattern of the first mold 64, and the base 621 of the imprinting object 62 will not be broken.

The present invention is not limited to the above-described embodiments. Various alternatives, modifications and equivalents may be used. Therefore, the above embodiments should not be taken as limiting the scope of the invention, which is defined by the appending claims.

What is claimed is:

1. An improved imprint device, comprising:

a chamber comprising a first pipe disposed at one side of said chamber, wherein a first fluid supplier is connected to said chamber through said pipe;

an imprinting object provided within said chamber, wherein said imprinting object can be permeated by a solvent fluid from said first fluid supplier and further be plasticized;

a first mold provided within said chamber, and stacked on the top of said imprinting object; and a drive component provided above said first mold within said chamber, used for pressing said first mold, wherein said drive component is a barrier film, said chamber further comprises a second pipe, said barrier film divides said chamber into two parts, including a first sub-chamber and a second sub-chamber, said first pipe and said second pipe are respectively disposed at said first sub-chamber and said second sub-chamber, wherein said imprinting object and said first mold are provided within said first sub-chamber, said second sub-chamber is connected to a second fluid supplier through said second pipe, said second fluid supplier is used for supplying a pressing fluid to said second sub-chamber.

2. The improved imprint device of claim 1, wherein said solvent fluid is a high-pressure fluid.

3. The improved imprint device of claim 1, wherein said solvent fluid is selected from one of a $CO_2$, $N_2H$, $SF_6$, Xe, $CHF_3$, $CCL_2F_2$, $NH_3$, acetone, toluene, ether, methanol, ethanol, or isopropanol.

4. The improved imprint device of claim 1, wherein said drive component is a pressing plate.

5. The improved imprint device of claim 1, further comprising a second mold provided within said chamber, wherein said imprinting object is stacked at the top of said second mold.

6. The improved imprint device of claim 1, wherein the operation temperature while said imprinting object is plasticized by said solvent fluid is lower than the glass transition temperature (Tg) of said imprinting object.

7. The improved imprint device of claim 1, wherein said imprinting object further comprises a base.

8. The improved imprint device of claim 7, wherein said base is selected from one of a wafer, glass material, plastic material, or the combination thereof.

9. The improved imprint device of claim 1, wherein said barrier film is a flexible film.

10. The improved imprint device of claim 1, wherein said solvent fluid and said pressing fluid are high-pressure fluids.

11. The improved imprint device of claim 1, wherein said solvent fluid is selected from one of a $CO_2$, $N_2H$, $SF_6$, Xe, $CHF_3$, $CCL_2F_2$, $NH_3$, acetone, toluene, ether, methanol, ethanol, or isopropanol.

12. The improved imprint device of claim 1, further comprising a second mold provided within said chamber, wherein said imprinting object is stacked at the top of said second mold.

13. The improved imprint device of claim 1, wherein the operation temperature while said imprinting object is plasticized by said solvent fluid is lower than the glass transition temperature (Tg) of said imprinting object.

14. The improved imprint device of claim 1, wherein said imprinting object further comprises a base.

15. The improved imprint device of claim 14, wherein said base is selected from one of a wafer, glass material, plastic material, or the combination thereof.

* * * * *